May 25, 1965
Z. J. LANSKY
3,185,253
AIR LINE LUBRICATOR
Filed Feb. 25, 1963
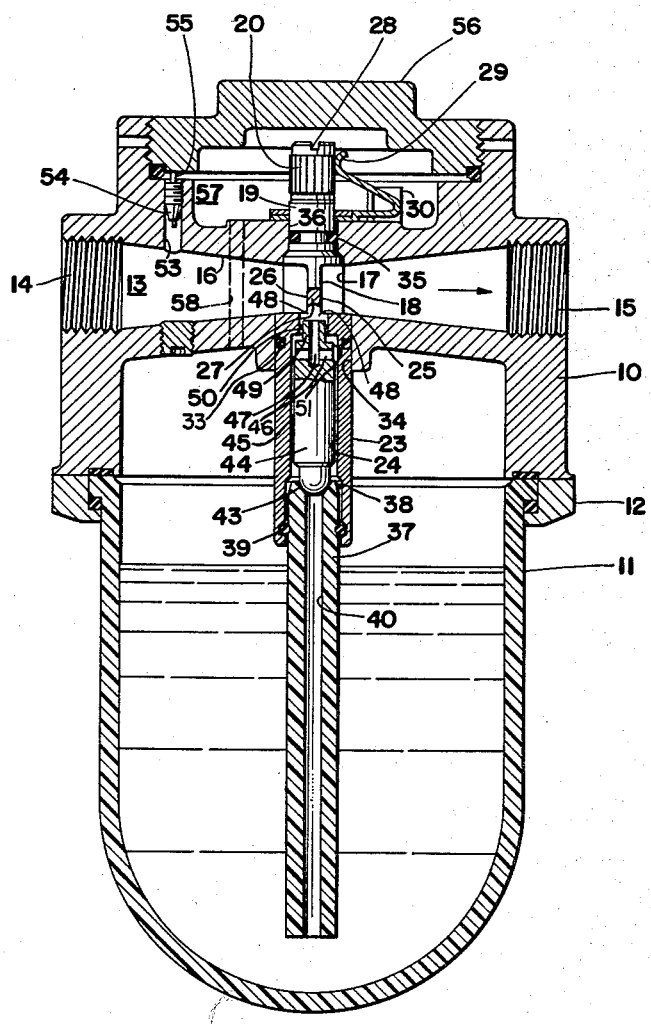
INVENTOR.
ZDENEK J. LANSKY
BY
John N. Wolfram
ATTORNEY 3,185,253
AIR LINE LUBRICATOR
Zdenek J. Lansky, Winnetka, Ill., assignor to Parker-Hannifin Corporation, Cleveland, Ohio, a corporation of Ohio
Filed Feb. 25, 1963, Ser. No. 260,411
5 Claims. (Cl. 184—55)

This invention relates to lubricators for introducing lubricant in finely divided form into the air supply of a pneumatic system. The invention is an improvement in the type of lubricators shown and described in Endebak et al. Patent 2,889,009.

Lubricators of the type shown in the above mentioned Endebak patent include a housing with a main passage through which the air in the pneumatic system passes. Attached to the housing is a bowl or reservoir for holding a supply of oil. The housing includes additional passages or ducts for directing part of the air flow to the top surface of the oil for forcing oil through a duct leading to the main air flow passage. In this duct is a porous element through which the lubricant is forced. The upper end of the porous element is exposed to the air in the main passage and as the oil seeps through the porous element it is picked up in finely divided form by the air in the main passage and passes with the air through a discharge port in the housing to the downstream portion of the pneumatic system where it lubricates the moving parts of the motor or other device being pneumatically operated. A check valve between the porous element and the reservoir prevents any reverse flow of oil, as well as preventing the possibility of air under pressure in the main passage from blowing through the porous element to the reservoir when the reservoir is depressurized. A venturi in the main passage provides a region of lower pressure in the main passage than in the inlet portion of the same so that there is a differential in pressure between the reservoir and venturi to cause the oil to flow to the venturi. The drop in pressure between the venturi and the inlet port may further be adjusted by means of a valve which adjusts the air passage opening through the venturi.

The porous element in lubricators of this type is subject to becoming clogged by foreign matter so as to excessively impede the flow of oil from the reservoir to the air passage and may become clogged to the extent of shutting off the flow of oil altogether. To avoid this it is an object of the present invention to substitute a member for the porous element which provides restricted passage for the oil and which has a self cleaning action to prevent clogging of the restricted passage.

It is another object to have the substitute member also serve as the check valve for preventing back flow through the duct leading from the reservoir to the air passage.

Other objects of the invention will be apparent from the description and from the drawing in which:

The single figure is a vertical cross-section view of the lubricator.

The lubricator has a housing 10 having a transparent bowl 11 attached thereto by means of a suitable clamp ring 12.

The housing has a main air passage 13 therethrough, this passage having an inlet port 14 for connection to a source of air under pressure and an outlet port 15 for connection to the unit to be pneumatically operated. Passage 13 has a reduced diameter portion 16 for providing a venturi effect. The reduced diameter portion 16 is intersected by a cylindrical opening 17 in which is mounted a rotary valve element 18 which has an upper stem portion 19 with a spline 20 and has a lower portion 23 with a bore 24 therein. The portion of valve element 18 which extends across passage section 16 is flatted on both sides as at 25, 26 to form a bladelike portion 27 which serves as a rotary valve element for increasing or decreasing the opening through passage portion 16. Valve element 18 may be rotated by means of a screw driver in slot 28 to any desired position for causing a predetermined pressure drop between the portions of passage 13 on the upstream and downstream sides of valve 18 and then locked in the set position by means of spring finger 29 engaged in spline 20.

A resilient packing ring 33 seals lower portion 23 of the valve member within counterbore 34 and a similar packing ring 35 seals stem 19 within body bore 36.

An oil pickup tube 37 extends into counterbore 38 of lower portion 23 of the valve member and is retained and sealed therein by a resilient packing ring 39. The tube has a duct 40 therethrough with a valve seat 43 at its upper end. Mounted within opening 24 is a floating control rod 44. The lower portion of the rod has a close fit within opening 24 so as to provide a restricted passage for oil in the form of an annular clearance 45. The lower end of rod 44 is shaped to act as a valve engageable with seat 43 for opening and closing duct 40.

An intermediate portion 51 of rod 44 is somewhat reduced in diameter as compared with the diameter of the lower portion of rod 44 so as to provide a greater clearance with opening 24 than clearance 45 and it has a cross drilled passage 46. Intermediate portion 51 also has an intersecting axial drilled passage 47 for conducting oil from opening 24 to drilled passages 48 in valve member 18 from which the oil becomes exposed to air passage 13. Rod 44 has a further reduced diameter portion 49 at its upper end which has a close guiding fit with bore portion 50 of valve element 15 for centering the upper portion of rod 44.

Leading from an inlet side of passage 13 is a duct 53 having a tire valve type check valve 54 mounted therein. Valve 54 has a stem 55 which is engaged by a cap 56 for maintaining valve 54 in open position when cap 56 is in place. Valve 54 is actuated to closed position by a spring (not shown) when cap 56 is removed. The upper end of duct 53 communicates with chamber 57 and another duct 58 connects the latter with the lower end of housing 10 where it is open to the interior of bowl 11.

When the lubricator is in operation air under pressure enters inlet port 14 and passes through venturi section 16 past valve element 18 and discharges through port 15 to the unit being pneumatically operated. A portion of the air from the inlet side of passage 13 passes through duct 53, check valve 54, chamber 57 and duct 58 to the lower side of housing 10 where it exerts pressure on the upper surface of the oil within bowl 11. This pressure on the oil forces oil through duct 40 in pickup tube 37 where it unseats rod 44 from seat 43 and passes through clearance 45, ducts 46, 47 and 48 to the lower pressure region of passage 13 where it is entrained in the air passing therethrough and is discharged with such air through outlet port 15. This flow of oil takes place because the pressure of the air acting on the top surface of the oil within bowl 11 is substantially the same as in inlet port 14 whereas the pressure of air acting on the oil emerging through ducts 48 is at a lower pressure due to the venturi action at 16 and the pressure drop caused by valve 18 between the upstream and downstream sides thereof in passage 13. As previously mentioned, this pressure drop may be varied by turning valve element 18 and as a consequence this serves as an adjustment for the amount of oil delivered through ducts 48 for any given pressure of air in inlet port 14.

During use, the pressure in passage 13 will fluctuate due to cycling of the pneumatic unit being operated and for other reasons. Also, there are periods of time in which the system is shut down so that there is no pressure in inlet port 14. Rod 44 will move downwardly as the pressure in passage 13 reduces during such fluctuations or shutdowns and will move upwardly again when the pressure increases. This movement provides a self cleaning action for preventing restricted annular clearance 45 from becoming clogged and thus the unit may operate indefinitely without requiring cleaning of clearance 45 or replacement of rod 44.

I claim:

1. In an airline lubricator, a housing having a passage for air therethrough, a reservoir carried by the housing containing a supply of lubricant, a first duct for directing air under pressure from the inlet side of said passage to the reservoir for pressurizing said lubricant, means providing a region in said passage with lower air pressure than at said inlet portion, a second duct leading from the reservoir to said low pressure region, a member in said second duct having opposite ends thereof respectively exposed to pressure of fluid in said low pressure region and said reservoir and movable by varying differentials in said pressures to a first position for closing said second duct and to a second position for opening said second duct, said member when in said second position providing a restricted passage through said second duct, said member when moving providing a self-cleaning action to avoid clogging of said restricted passage by foreign matter in said lubricant, said second duct including first and second cylindrical sections, and said member having a first portion within the first section to provide said restricted passage and having a second portion with a close fit within the second section for guiding said member.

2. The lubricator of claim 1 in which the member has a portion intermediate the first and second portion with a greater clearance with said first section than has the first portion, and said member has drilled passages connecting the exterior of said intermediate portion with said second section.

3. The lubricator of claim 2 in which said intermediate portion is of a diameter intermediate those of said first and second portions.

4. In an airline lubricator, a housing having a passage for air therethrough, a reservoir carried by the housing and containing a supply of lubricant, a first duct for directing air under pressure from the inlet side of said passage to the reservoir for pressurizing said lubricant, means providing a region in said passage with lower air pressure than at said inlet portion, a second duct leading from the reservoir to said low pressure region, a valve member in said second duct having opposite ends thereof respectively exposed to pressure of fluid in said low pressure region and said reservoir and responsive to varying differentials in such pressures for opening and closing said second duct against all flow of lubricant therethrough said valve member having a section spaced from the wall of the second duct to form therebetween a restricted passage, said section providing a self-cleaning action when the valve member moves to avoid clogging of said restricted passage by foreign matter in said lubricant.

5. The lubricator of claim 4 in which the valve member closes the second duct at a location between the valve member and the reservoir.

References Cited by the Examiner
UNITED STATES PATENTS

| | | | |
|---|---|---|---|
| 2,511,016 | 6/50 | Seman | 184—55 |
| 2,726,841 | 12/55 | Crist | 251—120 |
| 2,889,009 | 6/59 | Endebak et al. | 184—55 |

LAVERNE D. GEIGER, *Primary Examiner.*

MILTON KAUFMAN, *Examiner.*